United States Patent
Sham et al.

[19]
[11] Patent Number: 5,865,104
[45] Date of Patent: Feb. 2, 1999

[54] FOOD STEAMER

[75] Inventors: John C. K. Sham, Hong Kong, Hong Kong; Kumkit KunavongVorakul, Bangkok, Thailand

[73] Assignee: Wing Shing Products (BVI) Co. Ltd., Aberdeen, Hong Kong

[21] Appl. No.: 116,232

[22] Filed: Jul. 16, 1998

[51] Int. Cl.⁶ .............................. A47J 27/00; A47J 27/04; A47J 37/00

[52] U.S. Cl. ............................ 99/417; 99/446; 99/448; 99/473; 99/483; 126/369.1; 219/401

[58] Field of Search ........................ 99/339, 340, 341, 99/326–331, 345, 400, 403, 410–418, 444–446, 448, 450, 483, 473, 476; 126/20, 20.1, 20.2, 369, 369.1, 369.2, 369.3; 219/401

[56] References Cited

U.S. PATENT DOCUMENTS

| | | | |
|---|---|---|---|
| 385,794 | 7/1888 | Davis | 126/369.2 |
| 2,565,614 | 8/1951 | Magley | 99/418 X |
| 3,774,008 | 11/1973 | Maniscalco | 219/401 |
| 4,010,349 | 3/1977 | Lee | 126/20 X |
| 4,509,412 | 4/1985 | Whittenburg et al. | 99/331 |
| 4,655,192 | 4/1987 | Jovanovic | 126/369.1 |
| 4,660,542 | 4/1987 | Scherer | 99/403 X |
| 5,097,753 | 3/1992 | Naft | 99/341 |
| 5,195,424 | 3/1993 | Guajaca | 99/417 X |
| 5,216,947 | 6/1993 | Cheng | 99/448 X |
| 5,404,803 | 4/1995 | Glucksman | 99/473 |
| 5,458,050 | 10/1995 | Su | 99/340 |
| 5,584,235 | 12/1996 | DuBois et al. | 99/413 |

*Primary Examiner*—Timothy F. Simone
*Attorney, Agent, or Firm*—Salzman & Levy

[57] ABSTRACT

A food steaming device is described that has a base unit that commonly supports a removable food steaming cabinet and a removable, adjacent water supply tank for ease of cleaning. The food steamer appliance also features automatic water flow regulation from the water supply tank, and continual steam supply from the base unit, despite removal of the water tank.

14 Claims, 6 Drawing Sheets

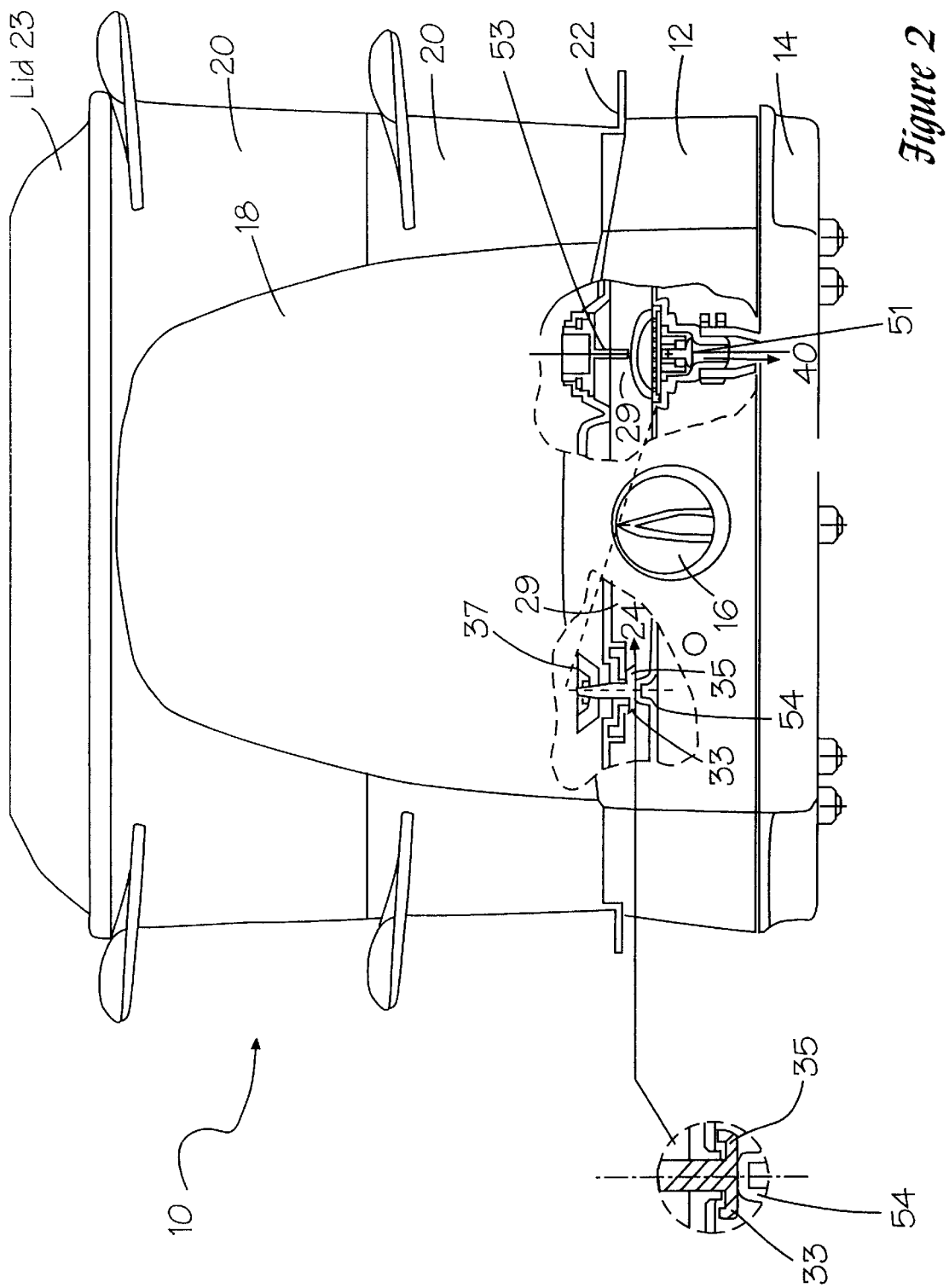

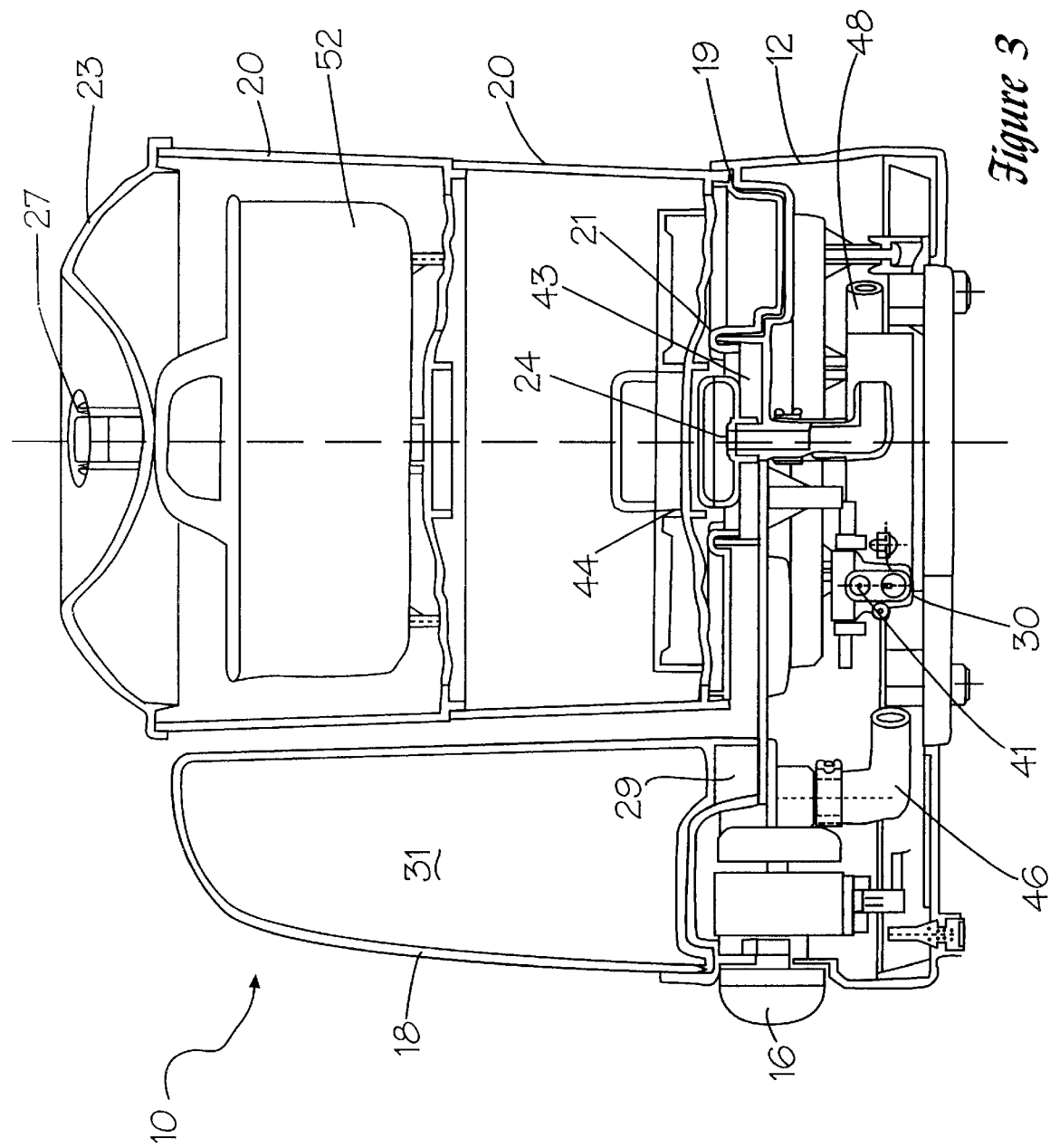

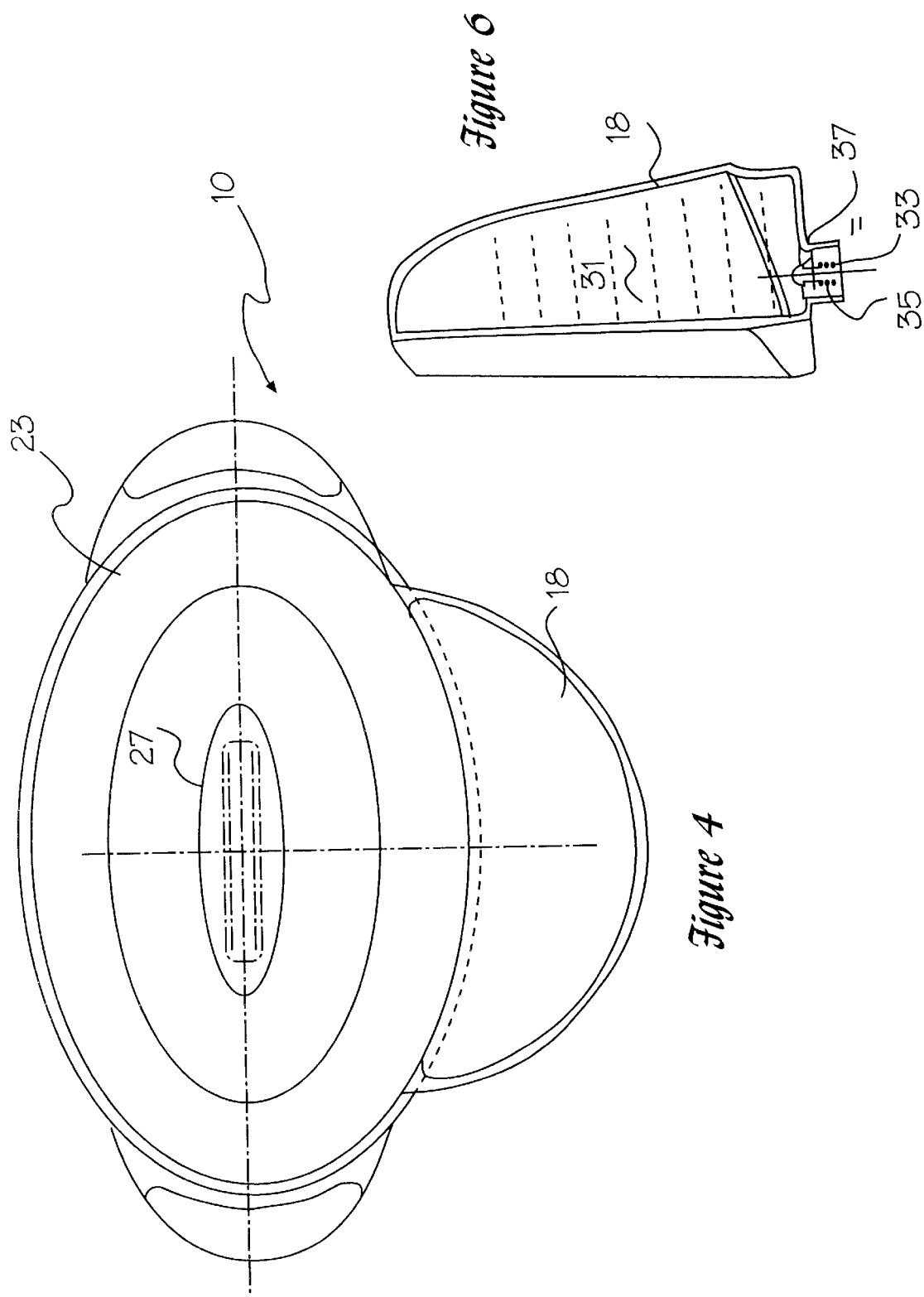

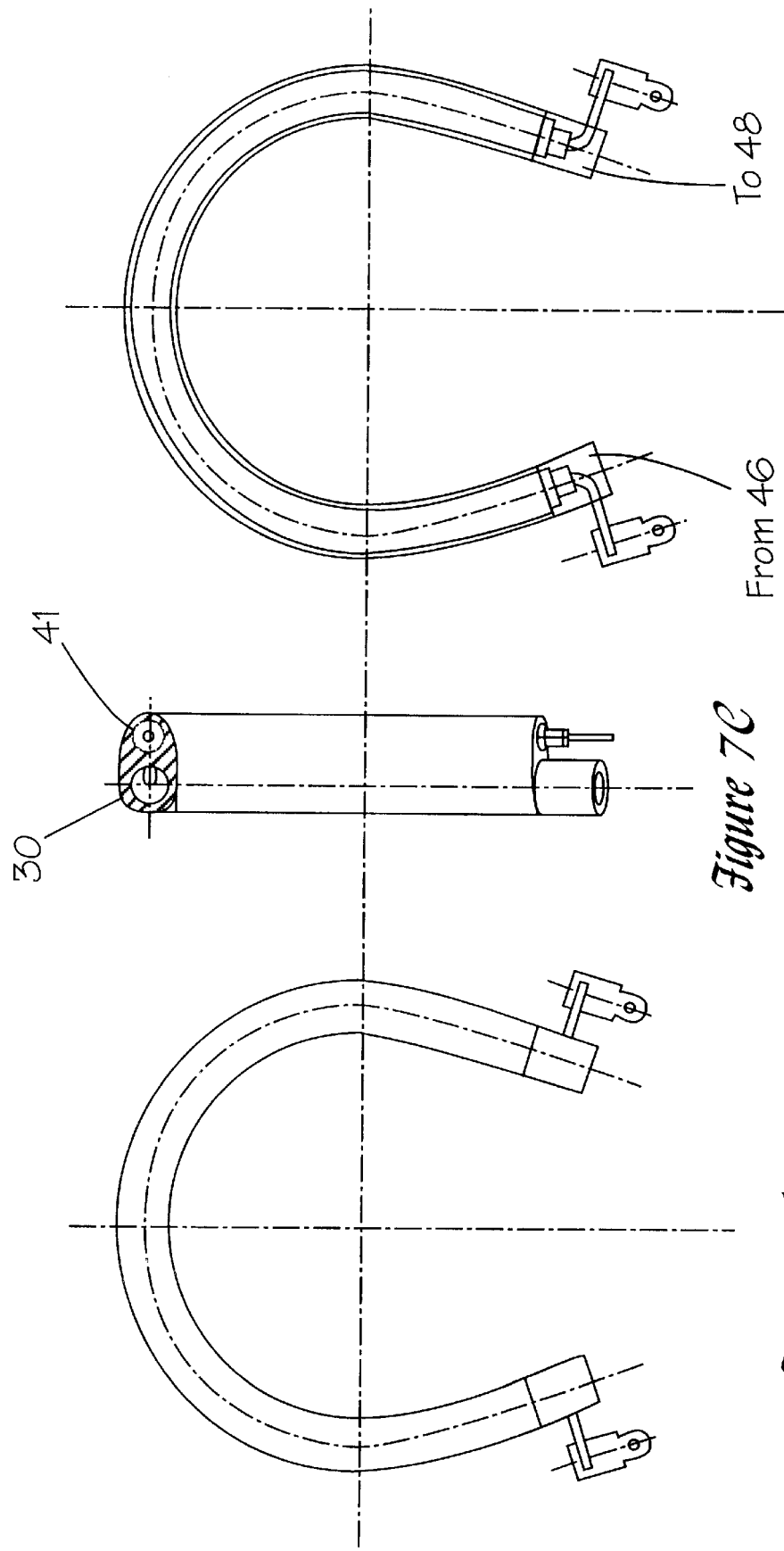

FOOD STEAMER

FIELD OF THE INVENTION

The present invention relates to household cooking appliances and, more particularly, to a food steamer having an externally situated, removable water tank for supplying water to make instantaneous steam.

BACKGROUND OF THE INVENTION

In recent times, household food steamer appliances have become very popular. One such appliance for steaming food is illustrated in U.S. Pat. No. 5,404,803, issued to Glucksman on Apr. 11, 1995, for FOOD STEAMER UTENSIL. The steamer appliance features a water tank in which steam is generated. The steam from the water vessel then passes laterally into an adjacent cooking vessel, through a spout located upon the water vessel. The spout plugs into the water vessel, thus making the water vessel removable with respect to the cooking vessel, in which food is disposed. The removable water tank allows for ease of cleaning the appliance after use. The utensil has a section for collecting the drippings from the steamed food, so that the drippings are not reboiled by the steamer appliance. The cooking vessel and the water vessel are each mounted upon their individual bases, thus making each section independent of each other.

The present invention is similar to the steam utensil described above, but with some important improvements. The steam appliance of this invention comprises a more compact and efficient design, wherein both the water tank and the cooking vessel are each mounted upon a common base. Water from the water tank flows through a trap into a reservoir located in the center of the common base unit. The flow of water from the tank is automatically regulated. The flow stops automatically when a valve needle is closed by high pressure generated inside the circular heating tube.

Steam is generated as the water in the reservoir is fed to a hollow, circular heating tube. The circular heating tube allows for an efficient transfer of heat to the water, thus permitting the water to flash into steam within seconds. The steam, which is under high pressure within the heating tube, leaves the heating tube horizontally through a steam cap. The steam then rises quickly into the cooking vessel disposed directly above the heating tube.

Water entering the hollow heating tube causes the water level in the reservoir to drop, thus causing the flow of additional water from the tank to the reservoir. This automatic flow regulation provides a continuous and smooth steam generation within the appliance.

The separate reservoir located in the common base unit allows the water tank to be removed while steam is still being generated. The reservoir contains enough residual water to allow steam generation to continue for a sufficient time while the tank is replenished. This is an important advantage over the aforementioned steam utensil, because the tank can be refilled without interrupting the cooking cycle.

SUMMARY OF THE INVENTION

In accordance with the present invention, there is provided a food steaming appliance. The food steamer comprises a base unit that commonly supports both a water supply tank and a steam cabinet for steaming food. The steam cabinet comprises a lower drip tray for catching the juices of food being steamed within the cabinet, and a removable lid containing a handle. The lid is removable for inserting food into the steam cabinet. The common base unit comprises controls for setting cooking cycle parameters.

Water from the water supply tank flows into a reservoir located in the center of the common base unit. The flow of water from the tank is automatically regulated. Water flows through a trap located at the bottom of the tank into the reservoir. The flow automatically stops when a valve needle is closed by high pressure generated inside the circular heating tube. When the pressure inside the circular heating tube drops, the valve needle opens again and allows water from the reservoir to enter a hollow, circular heating tube for generating steam. The water level in the reservoir drops as the water enters the heating tube, thus causing additional water flow from the tank to the reservoir. This automatic flow regulation provides for a continuous and smooth steam generation to take place within the appliance.

The circular heating tube provides an efficient transfer of heat to the water, thus allowing the water to flash into steam within seconds. The steam, which is under high pressure within the heating tube, leaves the heating tube horizontally through a steam cap. The steam then quickly rises into the cooking cabinet disposed directly above the heating tube and base unit. The reservoir located in the common base unit allows the water tank to be removed, while steam is still being generated. The reservoir contains enough residual water to permit steam generation to continue while the tank is refilled.

It is an object of this invention to provide an improved food steaming appliance.

It is another object of the invention to provide a food steamer that has a self regulating water flow.

It is a further object of this invention to provide a food steaming appliance that comprises a removable steam cabinet and water supply tank, each mounted upon a common base unit.

BRIEF DESCRIPTION OF THE DRAWINGS

A complete understanding of the present invention may be obtained by reference to the accompanying drawings, when considered in conjunction with the subsequent detailed description, in which:

FIG. 2 depicts a front view of the food steamer appliance, shown in FIG. 1;

FIG. 3 shows a front, sectional view of the food steamer appliance, shown in FIG. 1;

FIG. 4 illustrates a top view of the food steamer appliance, depicted in FIG. 1;

FIG. 5 shows a top view of the steam cap of the food steamer appliance, illustrated in FIG. 1;

FIG. 6 depicts a side view of the water supply tank illustrated in FIG. 3, when disassembled from the base;

FIGS. 7a through 7c illustrate respective top, bottom, and sectional views of the heating tube of the food steamer appliance, shown in FIG. 3.

For purposes of clarity and brevity, like elements and components will bear the same designation throughout the figures.

DESCRIPTION OF THE PREFERRED EMBODIMENT

Generally speaking, the invention comprises a food steaming device that has a base unit that commonly supports a removable food steaming cabinet and a removable, adjacent water supply tank for ease of cleaning. The food steamer appliance also features automatic water flow regulation from the water supply tank, and continual steam supply from the base unit despite removal of the water tank.

Figure 1:
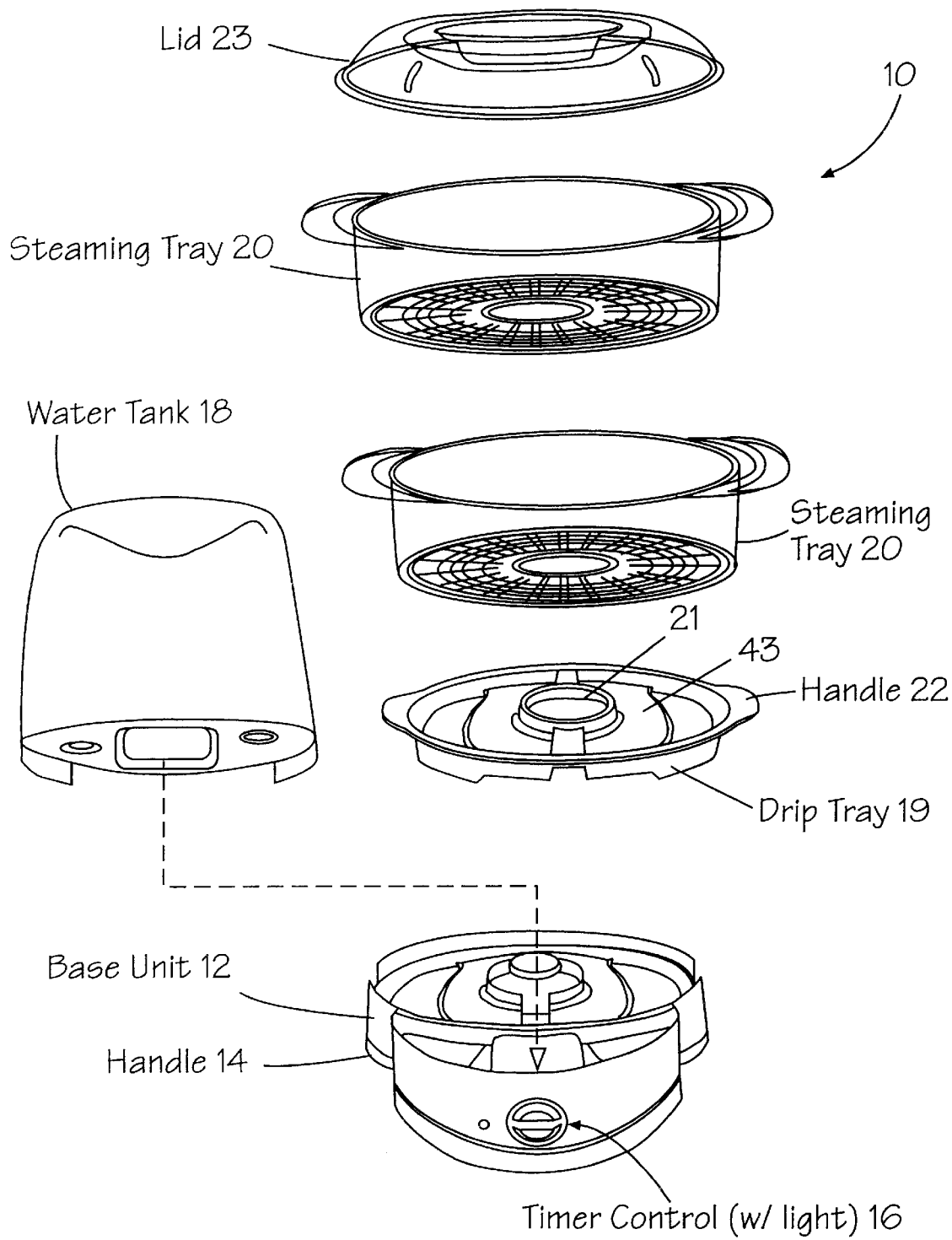
FIG. 1 illustrates an exploded, perspective view of the food steamer appliance of this invention.
Figure 8:
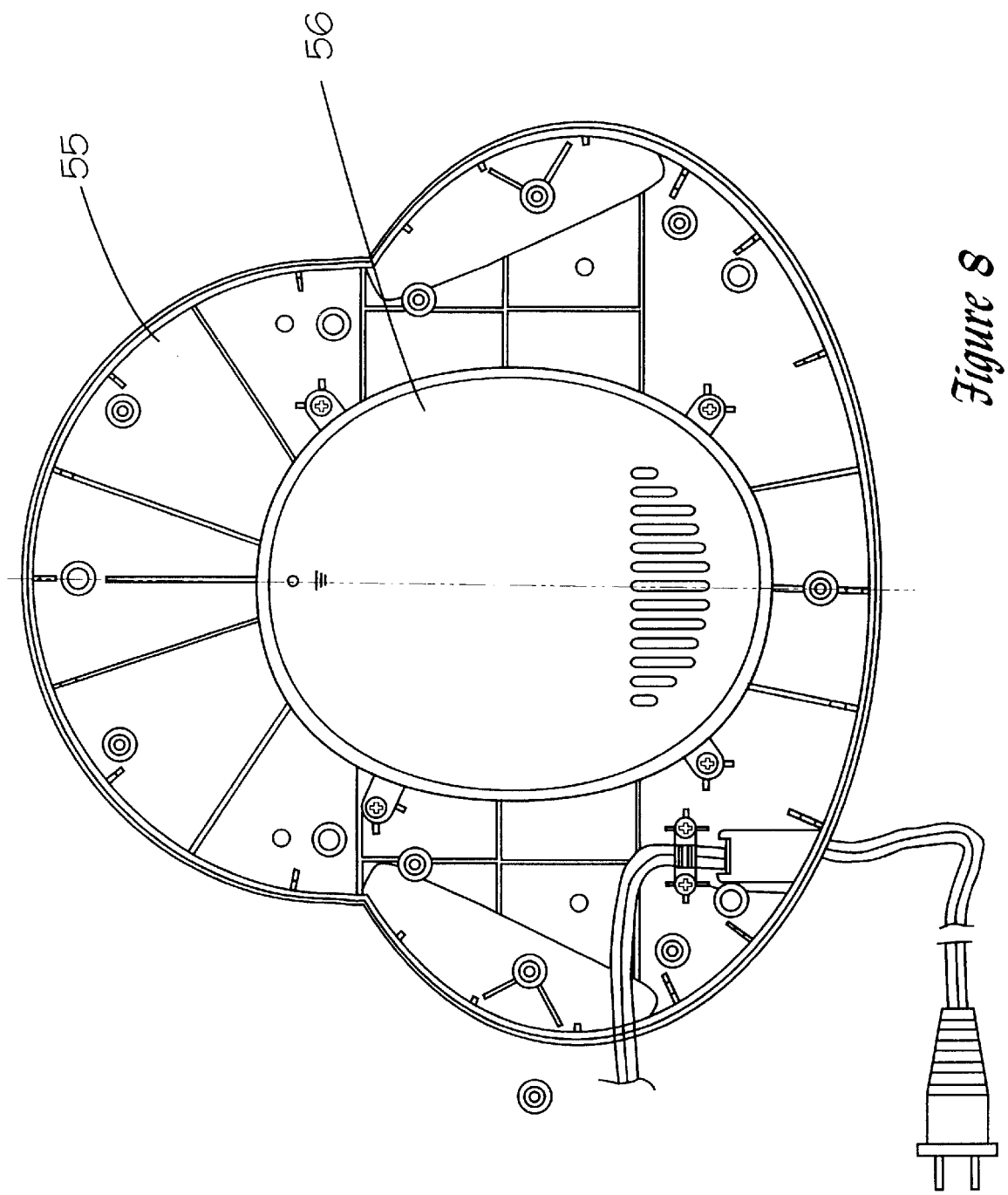
FIG. 8 shows the inner bottom view of the food steamer where a metal bottom plate is secured to a plastic bottom cover.

Now referring to FIG. 1, there is shown an exploded, perspective view of the food steamer appliance 10 of this invention. The appliance 10 comprises a base unit 12, which has a handle 14 for gripping the base unit, and a timer control knob 16 for setting the time for the food cooking cycle.

The base unit 12 comprises a circular heating tube element 30, shown more clearly in FIG. 7c. Electricity applied to the electrical coil heats the tube element 30 and is controlled through the control knob 16, which sets the cooking time. The control knob 16 is also lighted for use in dark or dimly lit areas of the kitchen. Above the control knob 16 is disposed a removable, transparent water tank 18, which supplies water (not shown) to the heating tube element 30. The water from the supply tank 18 is fed (arrows 24) to the reservoir 29.

The steam generated by the water in the heating tube element 30 is directed upwardly from the base unit 12 to a steaming cabinet or tray 20. The steaming tray 20 comprises two decks upon which different foods can be steamed. Inside the steaming tray 20 is a rice bowl 52 which is removable; it can be used to cook rice if desired. The steaming tray 20 rests upon a drip tray 19, which rests upon the base unit 12. The drip tray 19 catches the cooking juices of the steamed food, not shown. The steam from the base unit 12 travels from the heating tube 30 to a steaming nozzle 24 disposed upon the base unit 12, and then through an aperture 21 disposed in the center of the drip tray 19. The handle 22 disposed on the drip tray 19 allows drip tray 19 to be removed from the base unit 12 for cleaning purposes. As aforementioned, the drip tray 19 catches the juices from the steamed food, so that these juices do not circulate with the boiling water.

The steaming tray 20 is covered with a lid 23, and the water tank 18 has an inlet at the bottom thereof. Water can be introduced to the tank 18 by opening the inlet knob 53.

Referring to FIGS. 2 through 4, respective front, sectional, and top views of the appliance 10 are shown. The lid 23 disposed on steaming tray 20 has a handle 27 for removing the lid therefrom.

The water 31 disposed in the water supply tank 18 flows past a spring biased flow check valve 37, which is biased to the closed position when the tank 18 is removed, as shown in FIG. 6. This is for the purpose of preventing water 31 from leaking from the tank 18 during filling.

Once filled, the water supply tank 18 is fitted into the reservoir 29, as shown in FIG. 3. Placing the water tank 18 over a short boss 54 causes a plunger 33 to push against the biasing spring 35 of the check valve 37, thus lifting the check valve 37 from its seated position. The unseated valve 37 then allows water 31 to flow into reservoir 29, which conveys (arrows 24) the water 31 through the needle valve 51 and circular heating tube 30.

As the water 31 is fed (arrows 40) from the reservoir 29 to the heating tube 30 for generating the steam of the appliance 10, the level in the reservoir 29 drops, thus causing more water 31 to flow from tank 18. The water 31 disposed in the heating tube 30 is caused to flash into steam, not shown, by means of the heating coil 41. When steam is generated inside the circular heating tube 30, high pressure inside the tube is formed, closing the needle valve 51 to stop water flowing in. As steam flows out from steam cap 44, pressure inside the circular heating tube drops. Then water 31 flows into the heating tube 30 again for next cycle of steam generation.

The steam then travels upward to steam cap 44, shown in top view (FIG. 5). The steam continues to travel upwardly through the aperture 21 in the drip tray 19, which is formed in the solid abutment 43, as illustrated in FIG. 1, and then into the steam tray 20.

Referring to FIGS. 7a through 7c, the circular heating tube 30 is shown in respective top, bottom side, and sectional views. The circular heating tube 30 is anchored into the base unit 12. The fluid in the heating tube 30 flows into, and exits from, the tube 30 via conduits 46 and 48, respectively, as illustrated in FIGS. 3 and 7b.

All of the components of the appliance 10 are removable from the base unit 12, and are easily cleaned. The components comprise plastic polymer materials, such as polycarbonates or styrene, which are suitable for machine or hand washing.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A food steaming appliance, comprising:
   a steaming cabinet receiving steam for steaming foods;
   a water supply tank that is fillable with water to provide water for generating steam;
   a base for commonly supporting both said water supply tank and said steaming cabinet, said water supply tank and said steaming cabinet being removably disposed upon said base;
   a reservoir disposed in said base for receiving water from said water supply tank, and having regulating means for controlling the flow of water from said water supply tank to said reservoir;
   a drip tray disposed between said steaming cabinet and said base unit; and
   heating means disposed in said base for receiving water from said reservoir and converting said water into steam, said heating means directing said steam to said steaming cabinet through said drip tray.

2. The food steaming appliance in accordance with claim 1, wherein said heating means comprises a substantially circular heating tube.

3. The food steaming appliance in accordance with claim 2, further comprising a steam cap disposed on top of said base unit, said steam cap being in fluid communication with said substantially circular heating tube.

4. The food steaming appliance in accordance with claim 1, wherein said water supply tank further comprises a spring biased check valve for preventing leakage when said water supply tank is removed from said base unit for filling.

5. The food steaming appliance in accordance with claim 1, further comprising a flexible conduit disposed between said water supply tank and said reservoir for conveying water from said water supply tank to said reservoir.

6. A food steaming appliance, comprising:

a steaming cabinet receiving steam for steaming foods;

a water supply tank that is fillable with water to provide water for generating steam;

a base for commonly supporting both said water supply tank and said steaming cabinet, said water supply tank and said steaming cabinet being removably disposed upon said base;

a reservoir disposed in said base for receiving water from said water supply tank, and filling with water to a given level;

a drip tray disposed between said steaming cabinet and said base unit; and heating means disposed in said base for receiving water from said reservoir and converting said water into steam, said heating means directing said steam to said steaming cabinet through said drip tray.

7. The food steaming appliance in accordance with claim 6, wherein said heating means comprises a substantially circular heating tube.

8. The food steaming appliance in accordance with claim 7, further comprising a steam cap disposed on top of said base unit, said steam cap being in fluid communication with said substantially circular heating tube.

9. The food steaming appliance in accordance with claim 6, wherein said water supply tank further comprises a spring biased check valve for preventing leakage when said water supply tank is removed from said base unit for filling.

10. A food steaming appliance, comprising:

a steaming cabinet receiving steam for steaming foods;

a water supply tank that is fillable with water to provide water for generating steam;

a base for commonly supporting both said water supply tank and said teaming cabinet, said water supply tank and said steaming cabinet being removably disposed upon said base;

a reservoir disposed in said base for receiving water from said water supply tank;

a drip tray disposed between said steaming cabinet and said base unit; and heating means disposed in said base for converting said water into steam, said heating means directing said steam to said steaming cabinet through said drip tray, said heating means continuing to receive water from said reservoir even after removal of said water supply tank from said base unit.

11. The food steaming appliance in accordance with claim 10, wherein said heating means comprises a substantially circular heating tube.

12. The food steaming appliance in accordance with claim 11, further comprising a steam cap disposed on top of said base unit, said steam cap being in fluid communication with said substantially circular heating tube.

13. The food steaming appliance in accordance with claim 10, wherein said water supply tank further comprises a spring biased check valve for preventing leakage when said water supply tank is removed from said base unit for filling.

14. The food steaming appliance in accordance with claim 10, further comprising regulating means disposed in said base unit for maintaining water flow between said water supply tank and said reservoir.

* * * * *